(12) United States Patent
Marshall et al.

(10) Patent No.: US 7,116,330 B2
(45) Date of Patent: Oct. 3, 2006

(54) APPROXIMATING MOTION USING A THREE-DIMENSIONAL MODEL

(75) Inventors: Carl S. Marshall, Portland, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 09/796,401

(22) Filed: Feb. 28, 2001

(65) Prior Publication Data

US 2003/0020718 A1 Jan. 30, 2003

(51) Int. Cl.
*G06T 15/00* (2006.01)

(52) U.S. Cl. .................................................. 345/474
(58) Field of Classification Search ................ 345/473, 345/474, 375
See application file for complete search history.

(56) References Cited

U.S. PATENT DOCUMENTS

| | | | |
|---|---|---|---|
| 4,600,919 A * | 7/1986 | Stern ........................... | 345/473 |
| 4,747,052 A | 5/1988 | Hishinuma et al. ......... | 382/262 |
| 4,835,712 A | 5/1989 | Drebin et al. ............... | 345/426 |
| 4,855,934 A | 8/1989 | Robinson .................... | 345/419 |
| 4,901,064 A | 2/1990 | Deering ....................... | 345/426 |
| 5,124,914 A | 6/1992 | Grangeat | |
| 5,163,126 A | 11/1992 | Einkauf et al. | |
| 5,371,778 A | 12/1994 | Yanof et al. | |
| 5,611,030 A | 3/1997 | Stokes ......................... | 345/600 |
| 5,731,819 A | 3/1998 | Gagne et al. | |
| 5,757,321 A | 5/1998 | Billyard ....................... | 345/426 |
| 5,786,822 A | 7/1998 | Sakaibara .................... | 345/426 |
| 5,805,782 A | 9/1998 | Foran .......................... | 345/426 |
| 5,809,219 A | 9/1998 | Pearce et al. ................ | 345/426 |
| 5,812,141 A | 9/1998 | Kamen et al. ............... | 345/441 |
| 5,847,712 A | 12/1998 | Salesin et al. .............. | 345/428 |
| 5,894,308 A | 4/1999 | Isaacs ......................... | 345/420 |
| 5,929,860 A | 7/1999 | Hoppe ......................... | 345/419 |
| 5,933,148 A | 8/1999 | Oka et al. .................... | 345/427 |
| 5,949,969 A | 9/1999 | Suzuoki et al. ............. | 345/582 |
| 5,966,133 A | 10/1999 | Hoppe ......................... | 345/470 |
| 5,966,134 A | 10/1999 | Arias ........................... | 345/426 |
| 5,974,423 A | 10/1999 | Margolin .................... | 345/419 |
| 6,054,995 A * | 4/2000 | Allen et al. ................. | 345/619 |
| 6,054,999 A | 4/2000 | Strandberg .................. | 345/474 |
| 6,057,859 A | 5/2000 | Handelman et al. | |
| 6,078,331 A | 6/2000 | Pulli et al. .................. | 345/423 |
| 6,115,050 A | 9/2000 | Landau et al. .............. | 345/619 |
| 6,163,322 A * | 12/2000 | LaChapelle ................. | 345/473 |
| 6,175,655 B1 | 1/2001 | George, III et al. ........ | 382/257 |
| 6,191,787 B1 | 2/2001 | Lu et al. ..................... | 345/418 |
| 6,191,796 B1 | 2/2001 | Tarr ............................ | 345/581 |
| 6,198,486 B1 | 3/2001 | Junkins et al. .............. | 345/419 |
| 6,201,549 B1 | 3/2001 | Bronskill .................... | 345/441 |
| 6,208,347 B1 | 3/2001 | Migdal et al. | |

(Continued)

OTHER PUBLICATIONS

Joslin et al., Advanced Real–Time Collaboration, Oct. 2000, ACM, pp. 25–32.*
Face Lift: Bones For Facial Animation, Feb. 8, 2001, pp. 1–2, http://www.projectmessiah.com/x2/stories/story_bones_facial.htm.*

(Continued)

*Primary Examiner*—Phu K. Nguyen
(74) *Attorney, Agent, or Firm*—Fish & Richardson P.C.

(57) ABSTRACT

Motion of a user is approximated by obtaining a three-dimensional model to represent the user, tracking the motion of the user, positioning the three-dimensional model to approximate the motion of the user, and rendering a two-dimensional image from the positioned three-dimensional model. The three-dimensional model includes one or more bones. Positioning the three-dimensional model includes adjusting a position of at least one of the bones.

27 Claims, 5 Drawing Sheets

U.S. PATENT DOCUMENTS

| | | | |
|---|---|---|---|
| 6,219,070 B1 | 4/2001 | Baker et al. ................. | 345/475 |
| 6,239,808 B1 | 5/2001 | Kirk et al. ................... | 345/582 |
| 6,252,608 B1 | 6/2001 | Snyder et al. ............... | 345/473 |
| 6,262,737 B1 | 7/2001 | Li et al. ....................... | 345/419 |
| 6,262,739 B1 | 7/2001 | Migdal et al. ............... | 345/423 |
| 6,292,192 B1 | 9/2001 | Moreton ...................... | 345/423 |
| 6,317,125 B1 | 11/2001 | Persson ....................... | 345/473 |
| 6,337,880 B1 | 1/2002 | Cornog et al. | |
| 6,388,670 B1 | 5/2002 | Naka et al. | |
| 6,405,071 B1 | 6/2002 | Analoui ....................... | 345/419 |
| 6,437,782 B1 | 8/2002 | Pieragostini et al. ........ | 345/426 |
| 6,478,680 B1 | 11/2002 | Yoshioka et al. ............ | 345/473 |
| 6,559,848 B1 | 5/2003 | O'Rourke .................... | 345/473 |
| 6,580,811 B1 * | 6/2003 | Maurer et al. ............... | 382/103 |
| 6,593,924 B1 | 7/2003 | Lake et al. .................. | 345/426 |
| 6,593,927 B1 | 7/2003 | Horowitz et al. ............ | 345/473 |
| 6,608,627 B1 | 8/2003 | Marshall et al. ............. | 345/619 |
| 6,608,628 B1 | 8/2003 | Ross et al. ................... | 345/619 |
| 2001/0026278 A1 | 10/2001 | Arai et al. ................... | 345/428 |
| 2002/0101421 A1 | 8/2002 | Pallister ....................... | 345/473 |

OTHER PUBLICATIONS

Ruttkay et al., Animated Chartoon Faces, Jun. 2000, pp. 1-10.*

"project:messiah 1.5—The Tools You Need", Feb. 8, 2001, http://www.projectmessiah.com/x2/products/messiah15_tools.htm.*

Joslin et al., "Advanced Real-Time Collaboration over the Internet", Oct. 2000, ACM, pp. 25-32.*

"pmG Introduces Messiah:Animate 3.0", Jul. 24, 2000, pp. 1-2.*

Lewis "Pose Space Deformation: A Unified Approach to Shape Interpolation and Skeleton-Driven Deformation" Centropolis, New Orleans, LA, 165-172.

Lasseter "Principles of Traditional Animation Applied to 3D Computer Animation" Pixar, San Rafael, California, 1987.

Thomas (Contributor) et al., "The Illusion of Life: Disney Animation" 47-51.

Hoppe, "Progressive Meshes" Microsoft Research, 99-108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27-36, 1998.

Taubin et al., "Progressive Forest Spilt Compression" IBM T.J. Watson Research Center, Yorktown Heights, NY.

Cohen-Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195-202.

Chow "Optimized Geometry Compression for Real-time Rendering" Massachusetts Institute of Technology, Proceedings Visualization 1997, Oct. 19-24, 1997, Phoenix, AZ, 347-354.

Markosian "Real-Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "Sketch: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29-37, 1995.

Raskar "Image Precision Silhouette Edges" University of North Carolina at Chapel Hill, Microsoft Research, 1999 Symposium on Interactive 3D Graphics Atlanta, GA, 135-231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures; computer graphics, image processing, and GIS" University of Maryland, Addison-Wesley Publishing Company, 1060-1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

Buck et al., "Performance-Driven Hand-Drawn Animation" NPAR, Jun. 13-22, 2000.

Lake et al., "Stylized Rendering Techniques for Scalable Real-Time 3D Animation" NPAR, 101-108. Jun. 2000.

Appel, Arthur, "The Notion of Quantitative Invisibility and the Machine Rendering of Solids." Proceedings of 22nd National Conference Association for Computing Machinery 1967.

Catmull et al., "Recursively Generated B-Spline Surfaces on Arbitrary Topological Meshes," Computer Aided Design, 10(6):350-355 (1978).

Chow, M., "Optimized Geometry Compression for Realtime Rendering," IEEE, pp. 347-354 (1997).

Coelho et al., "An Algorithm for Intersecting and Trimming Parametric Meshes", ACM SIGGRAPH, pp. 1-8 (1998).

Deering, M., "Geometry Compression," Computer Graphics. SIGGRAPH '95, pp. 13-20, 1995.

DeRose et al., "Subdivisional Surfaces in Character Animation", ACM, SIGGRAPH'98, pp. 85-94 (1998).

Elber, Gershon, "Interactive Line Art Rendering of Freeform Surfaces", Eurographics'99, 18(3):C1-C12 (1999).

Gooch et al., "A Non-Photorealistic Lighting Model for Automatic Technical Illustration," *Computer Graphics Proceedings, Annual Conference Series, SIGGRAPH'98*, pp. 447-452 (1998).

Gooch et al., "Interactive Technical Illustration," *ACM Interactive 3D*, pp. 31–38 (1999).

Heidrich et al., "Realistic, Hardware–Accelerated Shading and Lighting," ACM, (SIGGRAPH'99), pp. 171–178 (1999).

Hoppe, H., "Progressive Meshes," URL: http://www.research.microsft.com/research/graphics/hoppe/, (10 pgs.), ACM Press, Aug. 1998, pp. 99–108.

Kumar et al., "Interactive Display of Large Scale NURBS Models", ACM, Symp. On Interactive 3D Graphics, pp. 51–58 (1995).

Lander, Jeff, "Making Kine More Flexible," Game Developer Magazine, 5 pgs., Nov. 1998.

Lander, Jeff, "Skin Them Bones," Game Developer Magazine, 4 pgs., May 1998.

Markosian, L. et al., "Real–Time Nonphotorealistic Rendering," SIGGRAPH'97, 6 pgs. (1997).

Pedersen, "A Framework for Interactive Texturing on Curved Surfaces", ACM, pp. 295–301 (1996).

Pueyo, X. et al., "Rendering Techniques '96," Proc. of Eurographics Rendering Workshop 1996, EUROGRAPHICS, pp. 61–70 (1996).

"Rockwood, A. et al.," "Real–time Rendering of Trimmed Surfaces," Computer Graphics (SIGGRAPH '89 Proceedings) 23:107–116 (1989).

Sousa, M., et al., "Computer–Generated Graphite Pencil Rendering of 3–D Polygonal Models", Eurographics'99, 18(3):C195–C207 (1999).

Stam, J., "Exact Evaluation of Catmull–Clark Subdivision Surfaces at Arbitrary Parameters Values", SIGGRAPH 98 Conference Proceedings, Annual Conference Series, pp. 395–404 (1998).

Taubin et al., "3D Geometry Compression", SIGGRAPH'98 Course Notes (1998).

Wilhelms, J. & Van Gelder, A., University of California, Santa Cruz [online], 1997, [retrieved Dec. 28, 2004]. Retrieved from the Internet: <URL:http://graphics.stanford.edu/courses/cs448–01–spring/papers/wilhelms/pdf>, pp. 1–8, Apr. 1997.

\* cited by examiner

APPROXIMATING MOTION USING A THREE-DIMENSIONAL MODEL

TECHNICAL FIELD

This invention relates to approximating motion using a three-dimensional (3D) model and to rendering a non-photorealistic two-dimensional (2D) image from the 3D model.

BACKGROUND

A 3D model includes a virtual skeleton, comprised of bones arranged in a hierarchical tree structure. Surrounding the bones are polygons, such as triangles, which represent the skin of the 3D model. Movement of the polygons is tied to the movement of the bones so that the 3D model approximates real-life movement when the bones are re-positioned.

DESCRIPTION

Figure 1:
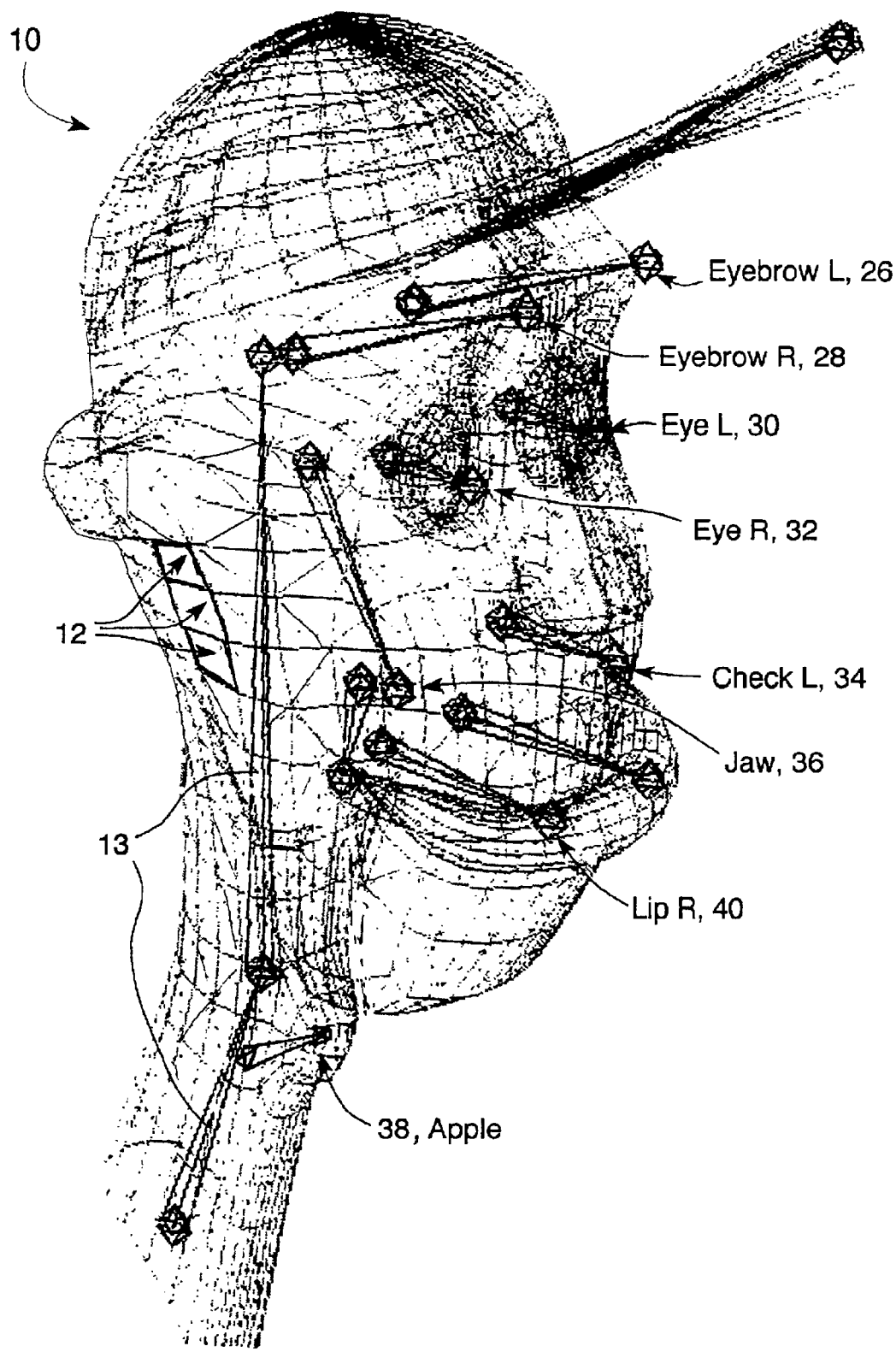
FIG. 1 is a perspective view of a 3D model, which shows both polygons and bones that make up the 3D model.

FIG. 1 shows a 3D model 10, which is rendered from 3D data. As shown in FIG. 1, 3D model 10 is comprised of interconnecting polygons 12. Polygons 12 are triangles in this embodiment; however, other types of polygons may be used. Polygons 12 define the "skin" surface of 3D model 10.

The 3D data for model 10 also includes bone data. The bone data defines a rigid skeletal structure of model 10, which corresponds to the bones of a living being. The "bones" 13 of model 10 are Cartesian XYZ-space vectors in the 3D data. The bone data defines a size (magnitude) of the XYZ-space vectors and an orientation in XYZ-space of the vectors.

The bones of model 10 are linked together in a tree-like hierarchical structure, with "child" bones branching off from "parent" bones. Vertices of polygons 12 are associated with one or more bones such that motion of the bones is tied to motion of the polygons. The association is defined in the 3D data that makes up 3D model 10. Thus, a polygon deforms around a bone that the polygon is associated with, much the same way that skin surrounding living bone deforms in response to an applied force. The bones may change location in response to such force, but do not change shape.

The movement of 3D model 10 may be defined by a sequence of frames, which constitute snapshots of the 3D model at intervals of time. Each frame contains information about the position of a bone in 3D space at a particular instant in time. This information includes the displacement of the start of the bone from the end of its parent bone, the orientation of the bone relative to the orientation of its parent bone, one or more scaling factors that define the scale of the bone in 3D space, and the time of the displacement, orientation and scaling. Displacement and scale are represented as 3D vectors (e.g., Cartesian XYZ-space vectors). Orientation may be represented by rotation data, such as rotation matrices, Euler angles, or unit magnitude quaternions. An example of using a unit magnitude quaternion is described below.

A quaternion is a scalar number that has the form $$q=w+xi+yj+zk,$$

where i, j and k are imaginary numbers such that $$ii=jj=kk=-1 \text{ and } ij=k,$$

and where w, x, y and z are real numbers.

Imaginary numbers i, j and k correspond to Cartesian X, Y and Z axes, respectively. Thus, to change the orientation of the bone in the X-axis/i direction, the value of "x" is changed in the quaternion "q". To change the orientation of the bone in the Y-axis/j direction, the value of "y" is changed in the quaternion "q". To change the orientation of the bone in the X-axis/k direction, the value of "z" is changed in the quaternion "q". The displacement and scale vectors noted above may also need to be changed.

Figure 2:
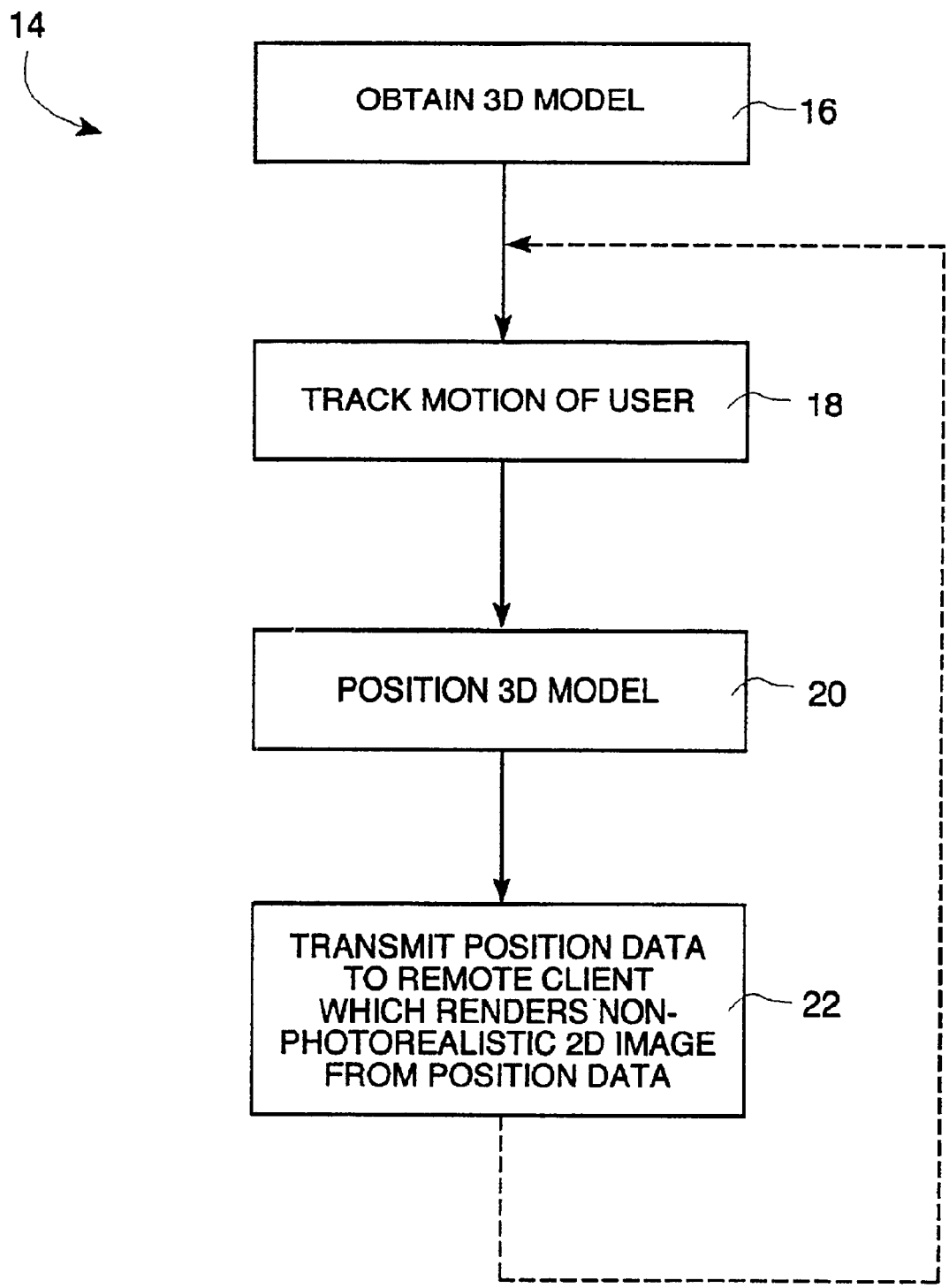
FIG. 2 is a flowchart showing a process for approximating motion of a user using the 3D model.

Referring now to FIG. 2, a process 14 is shown for approximating the motion of a user using a bones-based 3D model, such as 3D model 10 described above. Process 14 is particularly useful in video-conferencing applications or similar Internet-related applications, such as ICUII®.

By way of example, during video-conferencing, a first person at a local computer may wish to see the motion, e.g., facial expressions, of a second person at a remote computer. The second person, however, may not want the first person to see an actual image of the second person. Using process 14, the second person can represent himself using a 3D model that mimics the motion of the second person. A non-photorealistic 2D image can then be generated from the 3D model to create an animation that mimics the motion of the second person. The first person can view this animation during the conference. As a result, the first person can view the motion of the second person without actually seeing the second person.

Bandwidth limitations, particularly on Internet-related video-conferencing applications, may be one reason for using a non-photorealistic animation instead of actual video during video-conferencing. Preservation of anonymity may be another reason for electing to use a non-photorealistic animation instead of actual video during a video-conference.

Process 14 obtains (16) 3D model 10 from a source. For example, plural 3D models may be stored in a memory and 3D model 10 may be selected from among those stored 3D models in response to a user's input. Other ways of obtaining the 3D model are mentioned below. 3D model 10 is comprised of data defining polygons and rigid bones associated with the polygons, as shown, e.g., in FIG. 1.

Process 14 tracks (18) the motion of a user with the aid of a video camera, such as a Webcam or PCcam, and commercially-available motion tracking software. The video camera captures images, i.e., frames, of the user at specified intervals in time. The motion tracking software identifies features of the user using, e.g., pattern recognition techniques. For example, the motion tracking software receives frames captured by the video camera, compares blocks of data in those frames to pre-stored images, and determines the likelihood that the blocks of data correspond to features, such as eyes, based on how well the blocks match the prestored images. The motion tracking software detects motion by comparing the locations, e.g., in Cartesian XY coordinate space, of the same feature between two frames.

The motion tracking software provides process 14 with data indicating that features, e.g., an eyebrow, eyelid, or mouth, of the user have moved relative to an original position. The original position may be set beforehand during an initialization phase. That is, process 14 may require the user to sit in an initial position with relatively no facial contortions. This initial position may correspond roughly to an initial position of the 3D model obtained in block 16. The "motion" data provided by the motion tracking software may be vectors or the like that are indicative of the magnitude and direction of motion of each feature being tracked on the user.

Process 14 receives the motion data provided by the motion tracking software and positions (20) the selected 3D model 10 accordingly. Movement of 3D model 10 is effectuated by re-positioning the bones that make up the 3D model. In the bone data that defines 3D model 10, each bone is associated with a feature of the 3D model. For example, referring to FIG. 1, bone 26 is associated with the left eyebrow, bone 28 is associated with the right eyebrow, bone 30 is associated with the left eye, bone 32 is associated with the right eye, bone 34 is associated with a cheek, bone 36 is associated with a jaw, bone 38 is associated with the Adam's apple, bone 40 is associated with a lip, and so on. Re-positioning the bones, as noted above, causes the polygon "skin" also to deform.

Accordingly, to move features of 3D model 10, process 14 uses the motion data that defines movement of a feature of the user to adjust the location of corresponding bone(s) in 3D model 10. That is, as noted above, the motion data from the motion tracking software defines the magnitude and direction of motion of a feature of the user. Process 14 takes this data and, if necessary, modifies the quaternion that defines the orientation of the bone that corresponds to that same feature on 3D model 10. The displacement and scaling vectors that define the location of the bone are also modified, if necessary. So, if the user has moved his left eyebrow, the motion tracking software provides the appropriate motion data to process 14. Process 14 uses this motion data to modify the quaternion, displacement and/or scaling information that together define bone 26 of 3D model 10. This results in 3D model 10 mimicking the eyebrow motion of the user.

Once 3D model 10 has been appropriately positioned (20), process 14 retrieves and transmits (22) the positions of the bones (i.e., position data) of the 3D model to a remote client and the remote client renders a 2D image of the 3D model. The position data is sufficient to allow the remote client to render 2D images of the 3D model from the position data.

Figure 3:
FIGS. 3, 4, 5, 6, and 7 show 2D images of a 3D model rendered using non-photorealistic rendering techniques.
Figure 4:
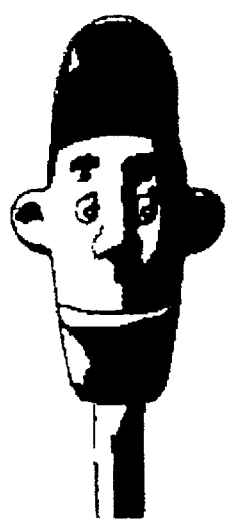
Figure 5:
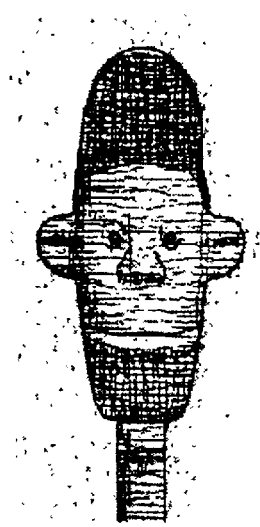
Figure 6:
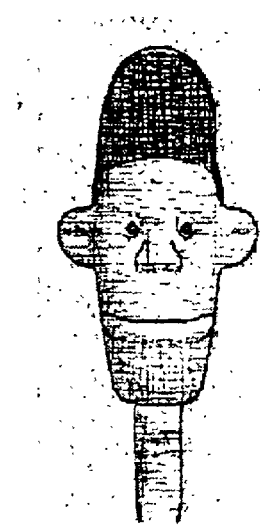
Figure 7:

In this embodiment, the remote client uses non-photorealistic 2D rendering to render the 2D image. Examples of non-photorealistic 2D rendering techniques include black-and-white rendering, cartoon rendering, and pencil-sketch rendering. Briefly, cartoon rendering provides non-gradual transitions between two or more differently-shaded image areas (see, e.g., FIG. 3). Black-and-white rendering provides only two types of shading—black areas and white areas (see, e.g., FIG. 4). Pencil-sketch rendering approximates shading and depth by varying the placement and density of discrete line segments. Unlike 3D shading, where transitions between light and dark regions of an image are gradual, pencil-sketch shading uses hard edge boundaries between regions. That is, pencil-sketch shading creates transitions between regions by terminating line segments in the regions, not by blending one neighboring region into another region. FIGS. 5, 6 and 7 show different types of pencil-sketch shading.

Figure 8:
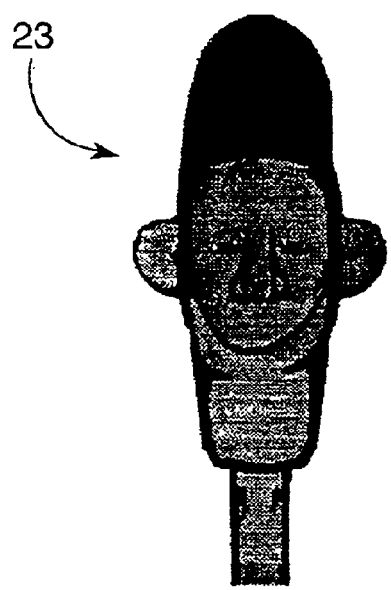
FIGS. 8, 9 and 10 show a 2D image of a 3D model rendered using a non-photorealistic technique with displaced facial features.
Figure 9:
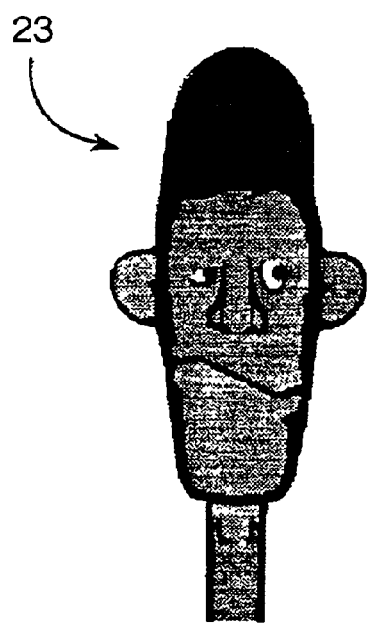
Figure 10:
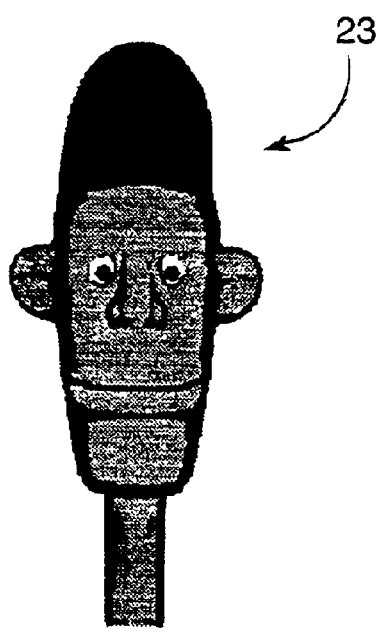

Thus, process 14 enables a remote client to render a non-photorealistic 2D image from a 3D model that approximates movements of a user captured by a video camera. For example, as shown in FIGS. 8, 9 and 10, movement of a user's mouth (not shown) can be approximated on a non-photorealistic 2D image 23. This requires relatively little data and processing capabilities to achieve.

Blocks 18, 20, and 22 of process 14 may be repeated in real-time, at pre-set time intervals, to produce an animation comprised of frames of non-photorealistic 2D images that approximates a user's movement. That is, process 14 tracks (18) motions of the user over a period of time, re-positions (20) the 3D model periodically to approximate motions of the user at specified intervals in the period of time, and transmits (22) positions of the bones at specified intervals.

Alternatively, rather than performing process 14 periodically, process 14 may be triggered by a significant movement of the user. For example, if motion data (e.g., a motion vector) provided to process 14 by the motion tracking software has greater than a predetermined magnitude, process 14 may be triggered to generate a new image. Otherwise, a previously-generated position of bones may be transmitted (24). This reduces processing, without significantly adversely affecting the quality of the resulting 2D animation.

Figure 11:
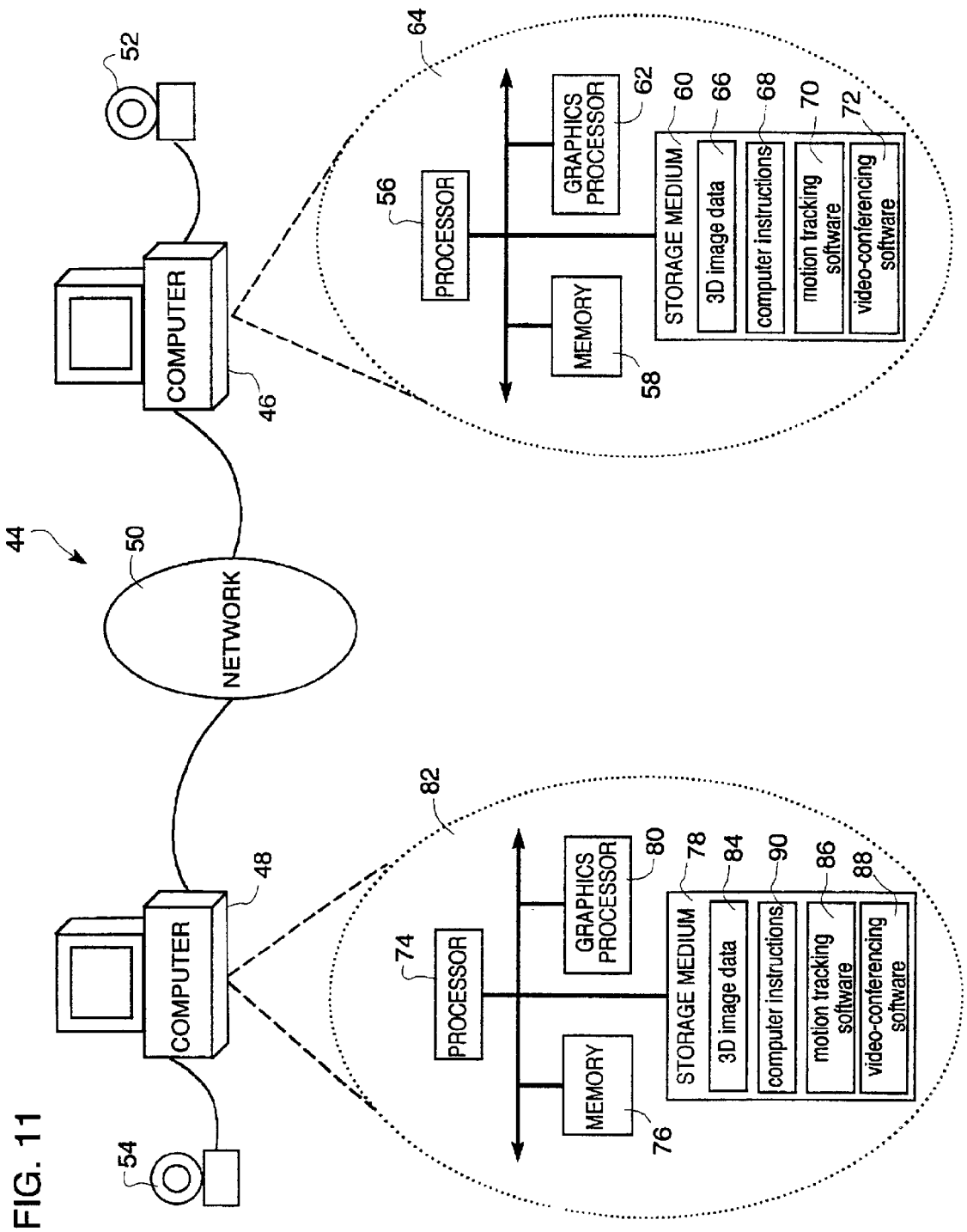
FIG. 11 is block diagram of a video conferencing system on which the process of FIG. 2 may be implemented.

FIG. 11 shows an example of a video-conferencing system 44 on which process 14 may be implemented. Video-conferencing system 44 includes, but is not limited to, two computers 46 and 48, which are connected by a network 50. At least one computer 46, i.e., the computer that runs process 14 to generate a non-photorealistic animation, includes an attached video camera 52 for capturing images of a user (not shown). The other computer 48 may also include a video camera 54.

Computer 46 includes a processor 56, a memory 58, a storage medium 60 (e.g., a hard disk), and a 3D graphics processor 62 for processing 3D data in accordance with process 14 to generate a non-photorealistic animation (see view 64). Storage medium 60 stores 3D data 66 for one or more 3D models, and machine-executable instructions 68 which are executed by graphics processor 62 out of memory 58 to perform process 14. Storage medium 60 also stores motion tracking software 70, and a video-conferencing application 72, such as ICUII®, for transmitting the non-photorealistic animation over network 50 (and for viewing video received from computer 48).

Computer 46 is connected to network 50 via a wired or wireless connection. Computer 46 transmits data for bone positions generated by process 14 over network 50 to computer 48, which is also connected to network 50. Computer 48 includes a processor 74, a memory 76, a storage medium 78, and a 3D graphics processor 80 that may also be used to implement process 14 (see view 82). Storage medium 78 stores 3D data 84 for one or more 3D models, motion tracking software 86, a video-conferencing application 88 for viewing the non-photorealistic animation from computer 46 (and for transmitting video data to computer 46), and instructions 90 that are executed by graphics processor 80 out of memory 76 to perform process 14 and to render 2D images from bone positions received from computer 46.

Although personal computers and a network are shown in FIG. 11, process 14 is not limited to use with the hardware and software of FIGS. 2 and 11. It may find applicability in any computing or processing environment. Process 14 may be implemented in hardware, software, or a combination of the two. Process 14 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform process 14 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 14. Process 14 may also be implemented as a computer-readable storage medium, configured with a computer program, where, upon execution, instructions in the computer program cause the computer to operate in accordance with process 14.

The invention is not limited to the embodiment described above. For example, process 14 is not limited to use with bones-based 3D models. It may be used with any 3D model that can be positioned and re-positioned. Similarly, process 14 is not limited to use with quaternion-based bone definitions.

Process 14 is also not limited to use in video-conferencing applications or to approximating facial features. It may be used on a stand-alone computer to animate the motion of any part of a user's body (or any non-user motion, for that matter). That is, rather than transmitting the position data to a remote client, the nonphotorealistic 2D image may be rendered on the stand-alone computer. Process 14 is not limited to use with stored 3D models. For example, process 14 may generate a 3D model "on-the-fly" based on video images of a user obtained by a video camera or process 14 may obtain a 3D model from another source, such as the Internet. Process 14 is also not limited to use with non-photorealistic rendering of 2D images or to the non-photorealistic techniques noted above.

Other embodiments not described herein are also within the scope of the following claims.

What is claimed is:

1. A method comprising:
    obtaining a three-dimensional model comprised of virtual bones to represent a user;
    identifying a feature of the user by comparing a block of data to a prestored image;
    tracking motion of the feature, the motion being defined by a vector;
    identifying a virtual bone that correspond to the feature;
    adjusting positioning of the virtual bone based on tracked motion of the feature so that a position of the virtual bone corresponds to the tracked motion of the feature, wherein adjusting is performed only if the vector has greater than a predetermined non-zero magnitude; and
    retrieving position data for the virtual bone.

2. The method of claim 1, wherein:
    the virtual bone is defined by bone data that specifies a size and a position of the virtual bone; and
    adjusting the position of the virtual bone comprises modifing bone data that specifies the position of the virtual bone.

3. The method of claim 2, wherein the bone data that specifies the position of the virtual bone comprises rotation data for the virtual bone in three-dimensional space.

4. The method of claim 1, wherein obtaining comprises selecting the three-dimensional model from a plurality of stored three-dimensional models.

5. The method of claim 1, wherein the position data defines positions of virtual bones in the three-dimensional model.

6. The method of claim 5, further comprising transmitting the position data to a remote client.

7. The method of claim 6, wherein the position data is usable by the remote client to render a two-dimensional image from the position data using a non-photorealistic rendering technique.

8. The method of claim 7, wherein the non-photorealistic rendering technique comprises one of black-and-white rendering, cartoon rendering, and pencil-sketch rendering.

9. The method of claim 1, wherein the motion comprises facial movements of the user.

10. An article comprising:
    a machine-readable medium that stores executable instructions that cause a machine to:
        obtain a three-dimensional model comprised of virtual bones to represent a user;
        identify a feature of the user by comparing a block of data to a prestored image;
        track motion of the feature, the motion being defined by a vector;
        identify a virtual bone that corresponds to the feature;
        adjust positioning of the virtual bone based on tracked motion of the feature so that a position of the virtual bone corresponds to tracked motion of the feature, wherein adjusting is performed only if the vector has greater than a predetermined non-zero magnitude; and
        retrieve position data for the virtual bone.

11. The article of claim 10, wherein:
    the virtual bone is defined by bone data that specifies a size and a position of the virtual bone; and
    adjusting the position of the virtual bone comprises modifying bone data that specifies the position of the virtual bone.

12. The article of claim 11, wherein the bone data that specifies the position of the virtual bone comprises rotation data for the virtual bone in three-dimensional space.

13. The article of claim 10, wherein obtaining comprises selecting the three-dimensional model from a plurality of stored three-dimensional models.

14. The article of claim 10, wherein the position data defines positions of virtual bones in the three-dimensional model.

15. The article of claim 14, further comprising transmitting the position data to a remote client.

16. The article of claim 15, wherein the position data is usable by the remote client to render a two-dimensional image from the position data using a non-photorealistic rendering technique.

17. The article of claim 16, wherein the non-photorealistic rendering technique comprises one of black-and-white rendering, cartoon rendering, and pencil-sketch rendering.

18. The article of claim 10, wherein the motion comprises facial movements of the user.

19. An apparatus comprising:
    a processor that executes instructions to:
        obtain a three-dimensional model comprised of virtual bones to represent a user;

identify a feature of the user by comparing a block of data to a prestored image;

track motion of the feature, the motion being defined by a vector;

identify a virtual bone that corresponds to the feature;

adjust positioning of the virtual bone based on tracked motion of the feature so that a position of the virtual bone corresponds to tracked motion of the feature, wherein adjusting is performed only if the vector has greater than a predetermined non-zero magnitude; and retrieve position data for the virtual bone.

20. The apparatus of claim 19, wherein:

the virtual bone is defined by bone data that specifies a size and a position of the virtual bone; and adjusting the position of the bone comprises modifying bone data that specifies the position of the virtual bone.

21. The apparatus of claim 20, wherein the bone data that specifies the position of the virtual bone comprises rotation data for the virtual bone in three-dimensional space.

22. The apparatus of claim 19, wherein obtaining comprises selecting the three-dimensional model from a plurality of stored three-dimensional models.

23. The article of claim 19, wherein the position data defines positions of virtual bones in the three-dimensional model.

24. The article of claim 23, further comprising transmitting the position data to a remote client.

25. The article of claim 24, wherein the position data is usable by the remote client to render a two-dimensional image from the position data using a non-photorealistic rendering technique.

26. The apparatus of claim 25, wherein the non-photorealistic rendering technique comprises one of black-and-white rendering, cartoon rendering, and pencil-sketch rendering.

27. The apparatus of claim 19, wherein the motion comprises facial movements of the user.

* * * * *